March 29, 1966   V. R. MAZZA   3,243,495
TRANSFORMERS WITH EVAPORATIVE COOLING SYSTEM
Filed Jan. 3, 1964
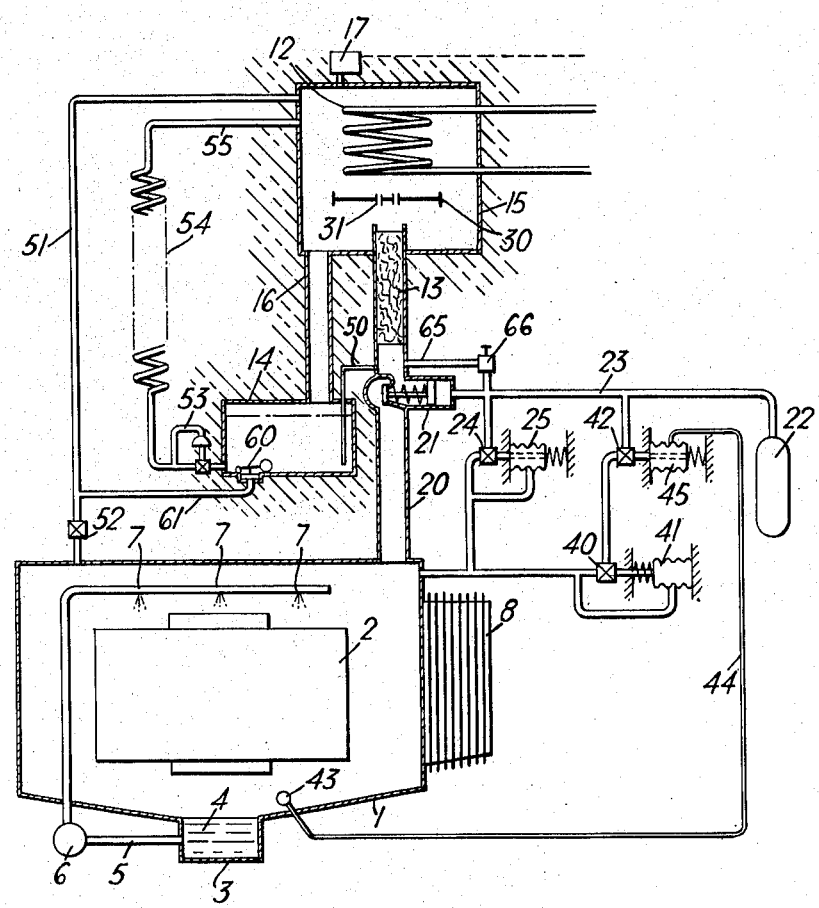
Inventor
Vittorio Roberto Mazza
Attorneys

United States Patent Office 3,243,495
Patented Mar. 29, 1966

3,243,495
TRANSFORMERS WITH EVAPORATIVE COOLING SYSTEM
Vittorio Roberto Mazza, Leatherhead, Surrey, England, assignor to E.R.A. Patents Limited, Leatherhead, Surrey, England, a British company
Filed Jan. 3, 1964, Ser. No. 335,636
Claims priority, application Great Britain, Jan. 10, 1963, 1,214/63
11 Claims. (Cl. 174—15)

As an alternative to the cooling of the windings of power transformers by the circulation of oil, the cooling may be effected by the evaporation of an inert high resistivity liquid which is sprayed on to the windings in sufficient quantities completely to cover the active or heat-producing surfaces. At the pressure conditions prevailing within the transformer casing this liquid needs to have a boiling point below the full load operating temperature of the windings so that it can function as an evaporative coolant and provide the necessary temperature control by evaporation either with or without boiling. During such evaporation the liquid transfers heat from the windings equivalent to the latent heat of the liquid evaporated and the vapour is then condensed, returned to a sump and again sprayed on to the windings as part of a closed cycle of operation.

For this purpose an evaporative cooling system thus requires a pump for the coolant which draws liquid from the sump and which may be driven by a motor supplied directly or indirectly from the transformer so as to operate at all times when the transformer is energised. This pump supplies a number of spray nozzles and in addition the system also includes a heat exchanger which is the equivalent of the normal radiator fitted to a transformer, by means of which the vapour is cooled and the condensed liquid is returned to the sump.

As mentioned above the liquid used needs to have a boiling point only slightly below the operating temperature of the windings under full load in order to avoid excessive pressures within the transformer casing. As a result of this the vapour pressure at normal ambient temperatures can be extremely low during the switching-in of the cold transformer. Now, although the vapour has sufficient dielectric strength to provide the necessary electrical insulation for the transformer at the temperature of normal, steady-state load conditions, this is not the case under normally low ambient temperature and as a consequence the cold transformer may not withstand the overvoltages resulting from the switching-in surge.

According to the present invention a power transformer having an evaporative cooling system as just described is operated with a mixture of two liquids one of which has a boiling point of the order already mentioned and the other having a much lower boiling point and the transformer is fitted with a separation plant connected to the transformer casing and including a condenser and a fractionating column for the fractional condensation of the two liquids, from which the condensed lower-boiling liquid passes to a reserve container and a greater part of the condensed higher-boiling-point liquid returns to the transformer casing. The presence of the second lower-boiling-point liquid provides the necessary insulation for the cold transformer under starting conditions while the excessive pressure which would otherwise result from the presence of this liquid at the operating temperature of the transformer is avoided by the provision of the separation plant which progressively withdraws the second liquid so that, by the time the normal operating temperature is reached, the proportion of the second liquid remaining in the transformer casing is not large enough to cause any appreciable increase in the internal pressure. Thus, when the transformer is first switched on the second liquid is in solution with the first and is present in sufficient quantity so that the vapour phase of the mixture consists mainly of the second liquid which thus provides the necessary insulation. As soon as the transformer is energised spraying starts and with the rise in pressure within the casing the separation plant comes into operation so as to begin the gradual withdrawal of the lower-boiling-point liquid. Subsequently when the transformer is shut down the process is reversed and the lower-boiling-point liquid held in the reserve container is returned once again to the transformer casing.

The separation plant is preferably connected to the casing by way of a valve which opens in response to a rise of pressure in the casing above a predetermined value and closes again in response to a pressure and temperature in the transformer casing corresponding to the substantially complete removal from the casing of the lower-boiling-point liquid. The valve may be servo operated so as to open under the influence of pressure admitted to a receiver from the transformer casing by way of a pressure-operated valve. This pressure is then released to close the valve again by means of valve mechanism responsive to conditions in the transformer casing corresponding to substantially complete removal of the lower-boiling-point liquid.

The condenser of the separation plant is preferably in the form of a refrigerated coil mounted above a device for returning a proportion of the condensed liquid to the fractionating column and directing the remainder to the reserve container. The proportion of condensed liquid returned to the fractionating column serves to sustain effective fractionation and as a consequence most of the higher-boiling-point liquid is condensed in the column itself and drips back into the transformer casing. A very small proportion of the lower-boiling-point liquid is also returned to the casing in this way but most of it passes to the reserve container where it is held until it is again required. A connection from the reserve container to the transformer casing may be provided which includes a pressure-operated one-way valve which allows vapour to pass back to the casing when the pressure in the latter drops on shutdown. In this way the lower-boiling-point liquid is returned to the casing in the form of vapour which is preferable to returning it in liquid form. During normal operation the pressure in the casing is sufficient to prevent any return flow of the lower boiling point liquid or its vapour, and any small quantity which may evaporate from the reserve container is recooled by the condenser and returned to the container once again.

In addition to the necessary components for the evaporative cooling system as already described, the separation plant thus consists solely of the condenser, the fractionating column, the reserve container and the necessary piped connections and valves. These, together occupy only a relatively small proportion of the total volume of the transformer casing so that efficient cooling is obtained at the expense of only a relatively small increase in the size of the equipment as a whole. By using the latent heat of the coolant as a result of the evaporative cooling process, the total quantity of coolant required is very greatly reduced.

A construction in accordance with the invention will now be described in more detail by way of example with reference to the accompanying drawings, which is a diagrammatic cross-sectional view in which the components of the separation plant are shown to a considerably larger scale than the transformer itself.

The transformer casing which is shown as 1 encloses a core and windings illustrated diagrammatically at 2. The casing includes a sump 3 for a quantity of coolant 4 consisting of a mixture of high and low boiling point liquids as already described. A pipe 5 leads from the sump 3 to a pump 6 driven by an electric motor supplied from the main or auxiliary windings of the transformer so as to operate at all times when the transformer is energised. The pump 6 supplies coolant to a series of spray nozzles 7 which direct a spray over the windings and core 2 so as to have both a cooling and insulating effect. The liquid coolant evaporates in coming into contact with the windings and the resulting vapour is condensed and returned to the sump 3 by means of a heat exchanger in the form of a normal radiator 8. The components so far described constitute the evaporative cooling system itself.

In order to avoid the high pressures arising from the use of the second low boiling point liquid, the casing 1 also has connected to it a separation plant comprising basically a condenser in the form of a coil 12, a packed fractionating column 13 and a reserve container 14. The coil 12 is mounted within a chamber 15 and this, together with the container 14 and a pipe 16 connecting the two, is fully heat-insulated, as indicated by the surrounding hatching. The column 13 may also be heat insulated. The coil 12 is connected directly to a standard refrigerator which is not illustrated in the drawing but which is controlled by a pressure switch 17 which operates to stop the refrigerator when the pressure in the chamber 15 drops below a preset value. The refrigerator compressor motor is supplied by the transformer so as to operate whenever the transformer is energised unless switched off by the switch 17.

The fractionating column 13 is connected to the casing 1 by way of a pipe 20 which includes a servo-operated valve 21 which is spring biased into the closed position and is opened against the spring force by the pressure in a receiver 22. The receiver 22 in its turn is connected to the casing 1 by means of a pipe 23 which includes a pressure-operated valve 24 controlled by bellows 25. This valve is set to open as soon as the pressure within the casing rises sufficiently after the transformer has been switched on and may, for example, open at a pressure of 1.5 atmospheres. As soon as this occurs the pressure in the receiver 22 is raised to the pressure of the casing 1 to open the servo-operated valve 21 and allow separation to start.

The mixed vapours passing upwardly through the column 13 are condensed by the coil 12 and drip back on to a reflux tray shown diagrammatically as 30. This is formed with central perforations 31 and both the tray itself and the perforations are formed with raised rims as shown in the drawings. Accordingly, as liquid overflows from the tray 30, a proportion of it flows down the pipe 16 to the reserve container 14 while the remainder flows back down the column 13 to wet the packing. As operation continues, so practically the whole of the vapour of the higher boiling point liquid is condensed in the packing 13 and drips back into the casing 1. The lower boiling point liquid continues to be condensed by the coil 12 and to flow into the container 14. With certain types of packing it is important to ensure that sufficient of the lower boiling point liquid flows back to the column 13 during the initial stages of the operation, hence small slots are formed in the bases of the rims surrounding the perforations 31 but these do not appear in the drawing.

As a result of the continued operation of the separation plant the lower boiling point liquid is progressively withdrawn from the casing 1 and when the separation is substantially complete it is desirable to close the valve 21 and thus to avoid continuous operation of the refrigerator supplying the coil 12. Owing to the withdrawal of the lower boiling point liquid the pressure in the casing 1 tends to drop below the value necessary to hold the valve 24 open. At this reduced pressure a valve 40 operated by bellows 41 opens. A second valve 42 opens when the temperature in the casing 1 reaches a predetermined value, being operated by a bellows 45 connected by a capillary 44 to a bulb 43 containing liquid which developes sufficient pressure to operate the valve at the required temperature. The combination of conditions necessary to open the two valves 40 and 42 which are connected in series, i.e. a relatively high temperature and low pressure, can only be achieved when substantially all the lower boiling point liquid has been withdrawn from the casing 1. When this occurs the valves 40 and 42 are opened and the pressure in the receiver 22 is released, thus closing the valve 21 and stopping the separation process. For a short time after this the refrigerator will continue to operate but since no further vapour is being withdrawn from the casing 1, the pressure will drop and the switch 17 will operate to stop the refrigerator. The mixed liquid held by the packing in the column 13 will drain downwardly and will pass along a pipe 50 into the reserve container 14. Under these conditions the transformer can continue to operate for long periods, the windings being cooled and insulated by means of the higher boiling point liquid alone. The liquid in the reserve container 14 which consists almost entirely of the lower boiling point liquid may tend to evaporate into the chamber 15 but, if this occurs, the resultant rise in pressure operating on the switch 17 will start the refrigerator and the vapour will be condensed and returned to the container 14.

When the transformer is shut down, however, the pressure in the casing 1 will begin to drop and a point will be reached when the pressure in the casing is less than the pressure in the chamber 15. At this stage vapour in the chamber 15 will pass along a pipe 51 and through a check valve 52 which is a lightly spring-loaded, one-way valve which normally prevents any reverse flow of vapour along the pipe 51. The continuing drop in pressure will cause evaporation of the liquid in the container 14 which will thus return to the casing 1. Since the container 14 is heat insulated, rapid evaporation will lower the temperature of the liquid in it and automatically lower the pressure in this container, thus delaying the reentry of vapour from the container 14 to the casing 1. In order to maintain the pressure in the container 14 at an adequate level for any evaporation rate, a pressure regulator 53 which may be set to operate at a pressure of slightly less than 1 atmosphere, for example, will open to allow liquid from the container to pass to an evaporator 54. This is in the form of a coiled heat exchanger which allows the liquid in the coil to absorb heat from the atmosphere, the resultant vapour passing along pipe 55 and thence along the pipe 51 to the casing 1. In this way, comparatively rapid evaporation of the liquid in the container 14 if required is automatically achieved and the liquid is returned to the casing 1 in vapour form.

In addition to the lower boiling point liquid, however, there will be a small proportion of the higher boiling point liquid which will not evaporate. To ensure that this also is returned to the casing a level valve 60 is fitted which operates in a manner similar to a ballcock and opens as the liquid level approaches the bottom of the container 14, thus returning the residue of the liquid to the casing 1 by way of a pipe 61.

The lower boiling point liquid is progressively returned to the transformer casing 1 as the transformer cools so that if the transformer requires to be restarted immediately after cooling is complete the lower boiling point liquid will be available for insulation purposes. On the other hand if the transformer is restarted while still warm and only part of the lower boiling point liquid has been returned to the casing the reduced requirement for this liquid will be satisfied. In other words the overall cooling system just described is capable of operating effectively whatever demands may be made from the transformer. These may include the possibility of the transformer being shut down shortly before reaching its normal operating temperature and while the valve 21 is still held open by the pressure in the receiver 22. If under these conditions the transformer were to be restarted and if the ambient temperature had in the meantime dropped appreciably, there would be the possibility of the valve 21 remaining open and of the separation process being restarted and continuing indefinitely since the normal operating temperature and pressure might not now be reached. To overcome this difficulty a connection 65 is made between the pipe 23 and the pipe 20, this pipe including an adjustable leak 66 which enables the pressure in the receiver 22 to leak away at a slow controlled rate. Accordingly under the conditions just mentioned the pressure in the receiver 22 will eventually be reduced sufficiently to allow the valve 21 to close even if the transformer never reaches its normal operating temperature and pressure thus avoiding any unnecessary long term continuous running of the refrigerator.

The valves shown in the drawings are all pressure operated, for example, by means of bellows but it will be understood that electrically controlled valves may be substituted and that it is only necessary that these valves should operate under the particular conditions already described. As mentioned originally the cooling system is illustrated to a larger scale than the transformer itself so that whereas it appears from the drawing that the cooling system occupies nearly as much space as the transformer itself this will not be so in practice. One of the principal advantages of an evaporative cooling system is the considerably reduced quantity of coolant which is required and in practice the reserve container 14 and the chamber 15 will have volumes which are very much smaller than that of the casing 1.

The requirements for the boiling points of the two liquids have already been described and in practice both liquids used may be fluorochemical compounds, that having the higher boiling point being, for example of the type $SF_5(CF_2)_nCl$. A typical example of one of these series is a fully fluorinated hydrocarbon structure with trifluoromethoxy end groups, i.e. $CF_3O(C_xF_{2x})OCF_3$. A specific practical example is Δ-chloro-octa-fluoro-butyl-sulphur-pentafluoride (boiling point 99° C.) sold by Imperial Chemical Industries Ltd. under the name Telomer 4. Another similar compound named as Telomer 2 has a boiling point at standard atmospheric pressure of 48° C. For the second liquid having the lower boiling point ranging from 10° C. downwardly the following are typical substances of practical importance:

| | Approx. boiling point (° C.) |
|---|---|
| Dichlorotetrafluoroethane—$CF_2ClCF_2Cl$ | 4 |
| Perfluorobutane—$C_4F_{10}$ | −2 |
| Octafluorocyclobutane (Freon C 318)—$C_4F_8$ | −6 |
| Difluorodichloromethane (Arcton 12)—$CF_2Cl_2$ | −29 |
| Perfluoropropane—$C_3F_8$ | −38 |
| Monochlorofluoroethane—$CF_2ClCF_3$ | −39 |

I claim:

1. In a power transformer having an evaporative liquid cooling system operating within a pressure-resistant casing including a sump for a liquid coolant, spray means to spray liquid coolant within said casing, a pump to supply the spray means from said sump, a coolant mixture of first and second fluids, the first fluid having a boiling point less than the operating temperature of the transformer under full load and the second liquid having a lower boiling point and coolant mixture separation means connected to said casing, the improvement which comprises a fractionating column, tubular means connecting said column to said casing, condenser means connected to said column, a refrigerated condenser element within said condenser means, a receiver connected to said condenser means to receive a store liquid discharged by said condenser element, a master valve controlling flow of fluid through said tubular means, said valve being constructed to open in response to a rise in pressure in the casing above a predetermined valve and to close in response to a pressure in said casing corresponding to the substantially complete removal from the casing of said second fluid, a fluid flow line connecting said condenser means to said casing and a one-way check valve to permit flow through said line only when pressure in said casing is less than the pressure in said condenser means.

2. A power transformer according to claim 1 in which said fluid flow line includes a connection to said receiver between said check valve and said condenser means.

3. A power transformer according to claim 2 in which said connection to said receiver is made through a liquid level operated valve which opens when the level in said receiver falls below a predetermined level.

4. A power transformer according to claim 1 which includes an evaporator connected to receive liquid from said receiver by way of a pressure regulator and deliver fluid to said condenser means, the functioning of said evaporator serving to lower the temperature of liquid contained in said receiver.

5. A power transformer according to claim 1 wherein fluid flow between said casing and said condenser means is under the control of a first valve which is temperature controlled to open when the temperature in said casing rises to a predetermined value and a second valve which is pressure controlled to close when the pressure in said casing drops below a predetermined level, said first and second valves being connected in series.

6. A power transformer as claimed in claim 5 wherein said master valve is servo-operated by said first and second valves.

7. A power transformer according to claim 1, in which the condenser element is in the form of a refrigerated coil mounted above a device for returning a proportion of the condensed liquid to the fractionating column and directing the remainder to the reserve container.

8. A power transformer according to claim 7, in which the device is constituted by a perforated reflux tray of which the perforated portion is located above the fractionating column, the tray being formed with shallow rims round its edges and round the perforations so that the proportion of condensate overflow through the perforations is returned to the fractionating column.

9. A power transformer according to claim 8, in which the coil is located within a chamber fitted with a low-pressure switch for stopping the refrigerator when the pressure in the chamber drops below a predetermined value.

10. A power transformer according to claim 1, in which the receiver includes a level valve operated when the liquid level reaches the bottom of the reserve container, for returning higher-boiling-point liquid to the transformer casing.

11. A power transformer according to claim 1, in which the higher-boiling-point liquid is Δ-chloro-octa-fluoro-butyl-sulphur-pentafluoride, and the lower-boiling-point liquid is difluorodichloromethane.

References Cited by the Examiner
UNITED STATES PATENTS
3,023,263  2/1962  Berg _____ 174—15 X ROBERT K. SCHAEFER, *Primary Examiner.*

JOHN F. BURNS, *Examiner.*

J. F. RUGGIERO, *Assistant Examiner.*